United States Patent [19]

Burke et al.

[11] Patent Number: 5,278,989
[45] Date of Patent: Jan. 11, 1994

[54] DISTRIBUTED AMPLIFIER NETWORK MANAGEMENT SYSTEM

[75] Inventors: Timothy Burke, Plano; Harold K. Sohner, Richardson, both of Tex.; Hans-Hermann Junge, Brugg, Switzerland

[73] Assignee: Andrew Corporation, Orland Park, Ill.

[21] Appl. No.: 905,081

[22] Filed: Jun. 24, 1992

Related U.S. Application Data

[63] Continuation of Ser. No. 467,121, Jan. 18, 1990, abandoned.

[51] Int. Cl.$^5$ ............................................. H04B 5/00
[52] U.S. Cl. ...................................... 455/8; 455/14; 455/55.1; 455/67.3; 333/237
[58] Field of Search ............................. 455/8–; 333/237; 371/8.2, 8.1; 340/825.01, 292; 379/4, 26, 221

[56] References Cited

U.S. PATENT DOCUMENTS

| | | | |
|---|---|---|---|
| 2,980,793 | 4/1961 | Daniel | 455/55 |
| 3,278,850 | 10/1966 | Tadash-Tomizawa et al. | 455/55 |
| 3,519,935 | 7/1970 | Hochgraf | 455/14 |
| 3,750,020 | 7/1973 | Baba et al. | 455/55 |
| 3,868,575 | 2/1975 | Narbaits-Javreguy et al. | 455/55 |
| 3,896,380 | 7/1975 | Martin | 455/55 |
| 3,916,311 | 10/1975 | Martin et al. | 455/55 |
| 3,979,673 | 9/1976 | Martin | 455/55 |
| 3,979,674 | 9/1976 | Martin | 455/14 |
| 4,012,662 | 3/1977 | Martin | 455/55 |
| 4,232,206 | 11/1980 | Tooyama | 371/8.2 |
| 4,784,240 | 1/1991 | Keren-Zvi et al. | 371/8.2 |
| 4,847,837 | 7/1989 | Morales et al. | 371/8.2 |

FOREIGN PATENT DOCUMENTS

| | | | |
|---|---|---|---|
| 0102815 | 8/1979 | Japan | 455/55 |
| 0100758 | 7/1980 | Japan | 455/14 |
| 0060121 | 5/1981 | Japan | 455/55.1 |
| 59-172841 | 9/1984 | Japan | . |
| 0023244 | 1/1987 | Japan | 455/14 |
| 62-110206 | 5/1987 | Japan | . |
| 0136928 | 6/1987 | Japan | 455/14 |

*Primary Examiner*—Reinhard J. Eisenzopf
*Assistant Examiner*—Andrew Faile
*Attorney, Agent, or Firm*—Arnold, White & Durkee

[57] ABSTRACT

A communication system serving a plurality of radio units in a frequency blocked area includes a remotely controlled and remotely configurable network of radiating coaxial conductors. The radiating coaxial conductors, along with associated amplification devices, are arranged to provide radio communication to an area around the network using radio frequency radiation released by the plurality of radiating cables. Remote control to the system is provided by a control station which transmits control data to the amplification devices through the network of radiating coaxial conductors. The amplification devices are arranged to control the radiating coaxial conductors in such a way that, in response to receiving the control data, the radiating coaxial conductors may be reconfigured to overcome faults occurring in the system.

23 Claims, 9 Drawing Sheets

FLOWCHART FOR
AMPLIFIER 38 OR 40

DISTRIBUTED AMPLIFIER NETWORK MANAGEMENT SYSTEM

This application is a continuation of application Ser. No. 07/467,121, filed Jan. 18, 1990 abandoned.

FIELD OF THE INVENTION

The present invention relates generally to communication system maintenance and, more particularly, to maintenance of antenna/transmission elements in communication systems serving frequency blocked areas.

BACKGROUND OF THE INVENTION

Radio frequency communication over large or wide geographical areas has posed significant problems in the past Systems of this type generally must make communication available for radio units which have low power transmitters and which can move in any direction within the wide area coverage. Although there exist a number of systems of this type, few systems have been designed to cover generally inaccessible areas, or frequency blocked areas. For example, a subterraneous location such as a subway is inaccessible to wide area coverage systems operating above ground, because their transceivers cannot overcome the blocking effect of the earth.

Most systems which have been designed to address frequency blocked areas use multiple low power repeaters which are spaced at designated points to avoid the frequency blocking obstruction. Unfortunately, the use of low power repeaters is expensive to implement and burdensome to maintain.

There have been attempts to cover frequency blocked areas using radiating coaxial cables, as an antenna, to distribute the communication channel throughout the intended coverage area. Systems using this approach, however, have been limited to relatively small coverage areas due to the inherent signal loss in such coaxial cable. Moreover, these systems have failed to provide effective system management capability; for example, monitoring and controlling the system to handle: faults, system reconfigurations and on-going adjustments such as tuning and power level adjustments.

In most wide area coverage systems, such system management is accomplished by transmitting control and status response commands from a central computer to the respective repeaters. Because each repeater is in direct communication with the central computer, transmitting commands and/or receiving status information from the repeaters and other remote devices does not pose a significant problem.

Unlike many wide area coverage systems, systems designed to cover frequency blocked areas cannot communicate directly with a central computer. A central computer in a system covering frequency blocked areas is, by definition, blocked from communication with each of the repeaters or other remote system components.

Known prior art systems designed to provide communication in frequency blocked areas have been unable to provide control and monitoring functions with respect to the various components in such systems in a reliable, efficient and cost-effective manner.

SUMMARY OF THE INVENTION

In accordance with a preferred embodiment, the present invention provides a management arrangement for maintaining a communication system serving a plurality of radio units in a frequency blocked area. The arrangement includes conductors, including radiating transmission lines such as radiating coaxial cables, and amplification devices associated with the cables. The conductors and the amplification devices are arranged in a cascaded network to provide radio communication around the network using radio frequency radiation released by the transmission lines. A control station is used for transmitting control data to the amplification devices. The control data is used for controlling and/or monitoring the status of each amplification device.

Preferably, the transmission lines are radiating coaxial cables and are arranged in tandem segments to form the cascaded network, and each tandem segment is intercoupled with other tandem segments by one of the amplification devices to provide a path of communication through the radiating cables between the radio units and the communication system. The control data is passed along the network of radiating cables and coupled to selected ones of the amplification devices for changing the path of communication through the communication system in the event of a fault.

BRIEF DESCRIPTION OF THE DRAWINGS

Other objects and advantages of the present invention will become apparent upon reading the following detailed description and upon reference to the drawings in which.

Figure 1:
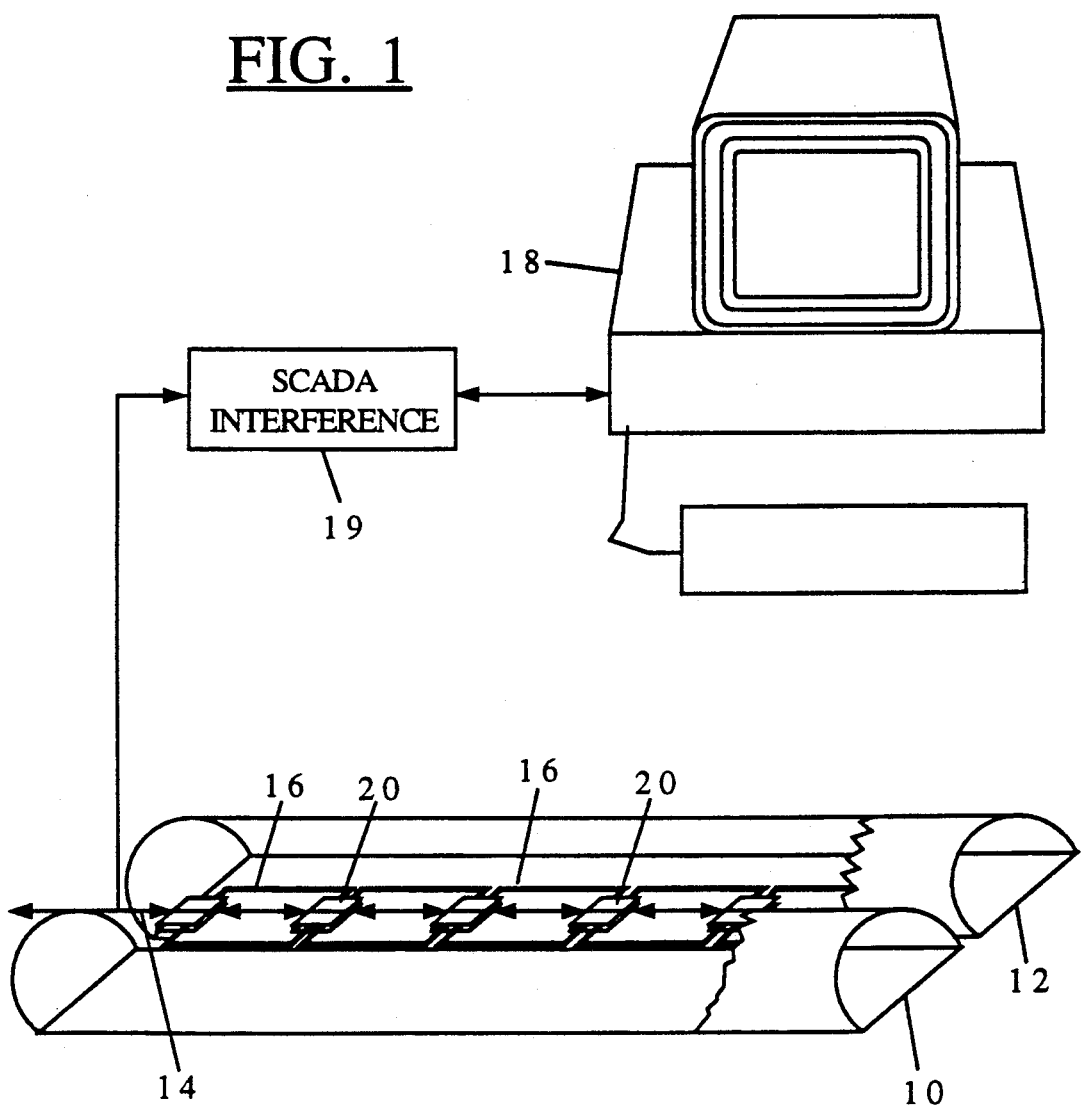
FIG. 1 is a diagram of a management system for a radio communication system, according to the present invention.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is directed to communication systems employing radiating cables, for example, radiating coaxial cables, arranged in a cascaded manner for communicating with radio units. While any radio system employing radiating cables would appreciate its merits, the present invention is especially suited for a system providing two-way radio communication, for example, a conventional FM (frequency modulated) cellular system, serving frequency blocked areas which are difficult to maintain manually.

FIG. 1 provides an illustration of a management arrangement for such a radio communication system. The system is shown serving a coverage area defined by a pair of tunnels 10 and 12 and includes a transceiver (not shown) coupled to a networked set of conductors 16, including radiating coaxial cables or "leaky" cables, at a port 14 near one end of the tunnels 10 and 12.

The leaky cables 16 are used as an antenna to transmit information to and receive information from radio units operating within the tunnel coverage area. A preferred type of leaky cable is the RADIAX ® cable, available from Andrew, Corp., Orland Park, Ill.

The management arrangement may be controlled from a control station 18, for example, a conventional personal computer, which is programmed to provide instructions to selected amplification devices 20 and to display their status The amplification devices 20 are interconnected by the leaky cables 16 and are preferably intelligent, insofar as they are capable of communicating with the control station 18. Such communication may be accomplished using a conventional low frequency shift-keying scheme.

The system shown in FIG. 1 involves two types of communication: radio communication between the radio units and the transceiver at port 14, and system management communication between the control station 18 and the amplification devices 14. Both types of communication may be implemented using the leaky cables 16 by modulating a carrier frequency with the information transmitted to and from the control station 18.

Alternatively, the radio communication with the radio units may be implemented as described above, and the system management communication may be implemented by using separate conductors, for example, coaxial cable or a twisted pair of dedicated conductors. The separate conductors, being part of the networked set of the conductors 16, should be capable of carrying signals over significant lengths, for example, up to 2 Km in length. Additionally, the signals carried over such distances should be received independently of DC bias levels and should be capable of handling long binary strings of ones and zeros. Thus, a PSK (phase-shift-keying) modulation format and/or conventional drivers, receivers and signal reconstruction circuits may be necessary to accommodate a given application. Although there is an added cost with this alternative approach, it is more reliable, because the system management communication is not dependent upon the radiating cable, which may be subject to fires and other hazardous conditions.

The information carried in the system management communication should be transferred in packets. For example, a preferred information packet includes: a header represented by a preselected synchronization code, an address to designate the amplification device to or from which the communication with the control station 18 is involved, the substantive information intended to be communicated, and, finally, a trailer which may include an error correcting code for data correction by the receiving device. This type of communication may be implemented using a conventional or modified SCADA (Supervisory Control and Data Acquisition) interface, depicted as block 19 in FIG. 1.

The substantive information carried in the packets preferably includes control and status information for remotely maintaining the operation of the system, and particularly for maintaining the operation of the conductors 16 and the amplification devices 20. For example, such information may include requests for status reports from the control station 18 to one or more selected amplification devices to determine if carrier information is being received by the amplification device, if an excessive amount of power or current is being drawn or if any power is being provided to the amplification device. The status of the amplification devices may be selectively or continuously displayed on the CRT of the control station 18 or printed at a conventional printing station (not shown). Additionally, commands may be issued from the control station 18 to certain amplification devices to change parameters of the amplification devices or to reconfigure their operation.

The communication protocol between the amplification devices and the control station 18 is preferably a polling technique controlled by the control station 18. The control station 18 polls each of the amplification devices at periodic intervals to determine the status of each amplification device. Using this approach, the amplification devices only transmit information in response to a request from the control station 18. However, should a fault in the system render this protocol inoperative, a conventional carrier-sense-multiple-access (CSMA) protocol is preferably used as a back-up protocol.

The CSMA protocol allows each amplification device to transmit status information to the control station 18 at regular intervals so long as it does not sense carrier present on the conductors carrying the system management communication. If carrier is present, indicating that another device is transmitting, the amplification device attempting to transmit delays for a random period before repeating the transmission attempt; thereby avoiding an otherwise inevitable communication collision.

Figure 2:
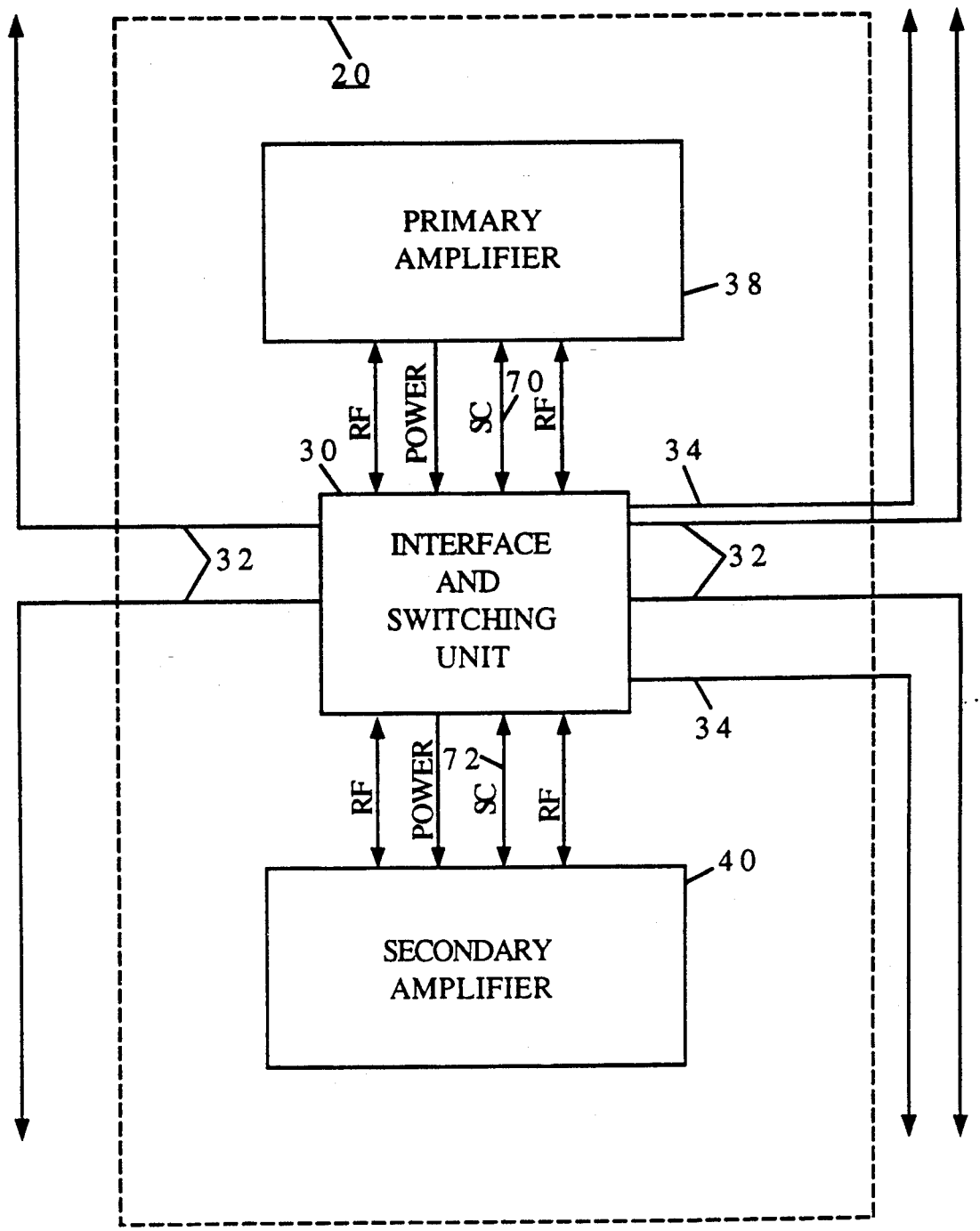
FIG. 2 is a block diagram of an amplifier device 20, including an interface and switching unit 30 and amplifiers 38 and 40, according to the present invention, which may be used as part of the radio communication system of FIG. 1.
Figure 3:
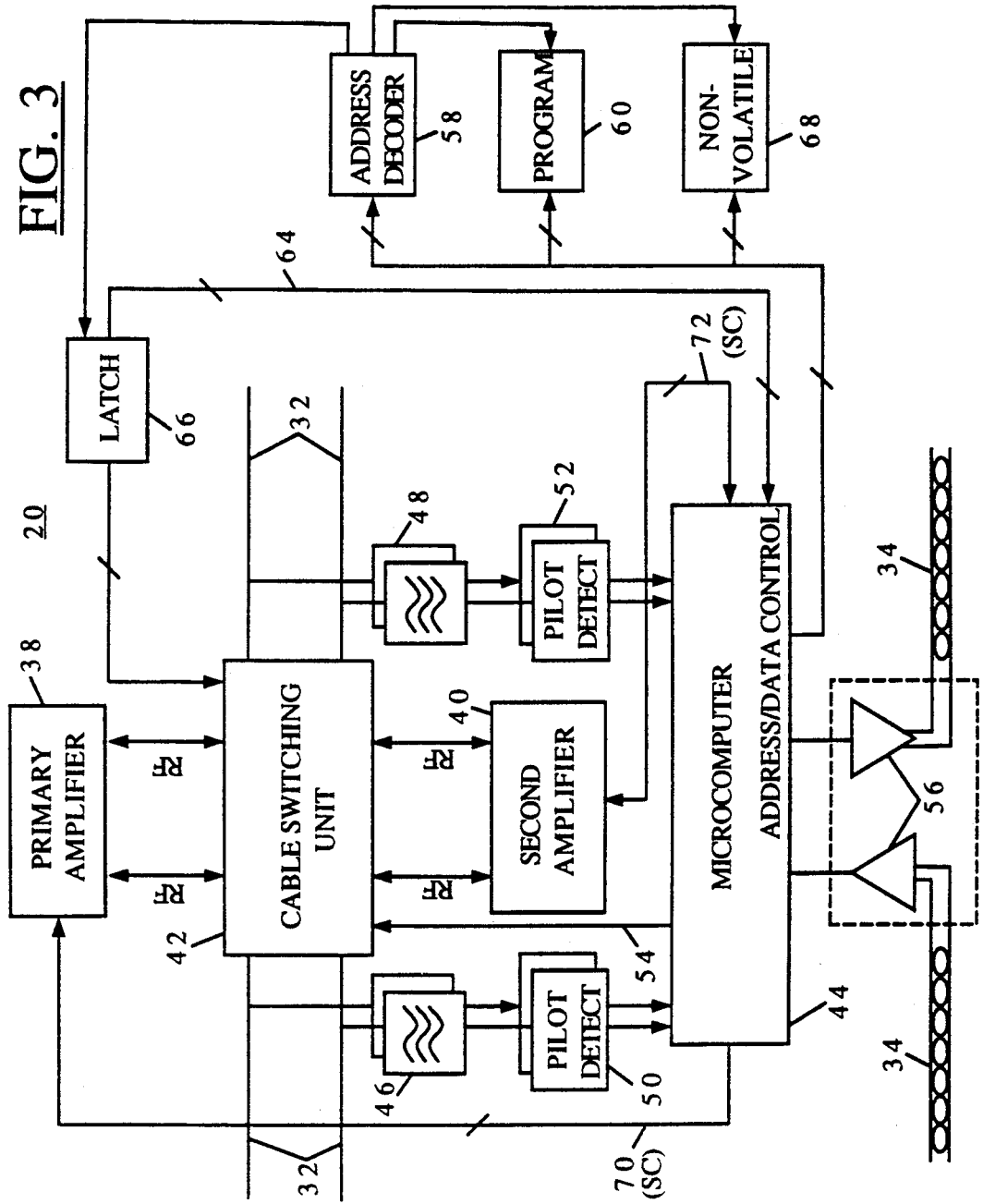
FIG. 3 is another block diagram of the amplifier device 20, shown with detail directed to the interface and switching unit 30 of FIG. 2.

The packeted information is received at each amplification device by an interface and switching unit (ISU) 30, as illustrated in FIGS. 2 and 3. FIG. 2 illustrates both radiating coaxial cables 32 and optional separate conductors 34; the latter being used for dedicated system management communication. Information carried by RF (radio frequency) energy is received over the radiating coaxial cables 32 and amplified by a primary amplifier 38 or a secondary (back-up) amplifier 40 before being passed on to the next tandem segment of radiating coaxial cables 32. As described in detail below, the secondary amplifier 40 may be activated to replace the primary amplifier 38 in the event of a fault to the primary amplifier 38, or to alleviate the effect of another type of system fault.

In FIG. 3, the amplification device 20 is shown with particular detail directed to the operation of the ISU 30. At the ISU, radio communication is received on the radiating cables 32, routed through a cable switching unit 42, and coupled to a microcomputer 44 via bandpass filters 46 and 48 and pilot detectors 50 and 52. The cable switching unit 42 is controlled by the microcomputer 44, using control lines 54, to couple the radio frequency energy to the amplifiers 38 and 40 for system reconfiguration in the event of a fault, for example, a broken radiating coaxial cable 32.

This type of cable fault may be detected on any one of the four cables 32 by the microcomputer 44 using the bandpass filters 46 and 48 and pilot detectors 50 and 52 to check the integrity of the cables 32. For example, in an 800 mega-Hertz FM two-way (two-frequency) radio communication system, a 5 mega-Hertz pilot tone may be used throughout the system to indicate continuity in the path carrying the incoming or out-going carrier frequency (as transmitted from or to the radio units operating on the system). The bandpass filters 46 and 48 and the pilot detectors 50 and 52 are used to signal to the microcomputer 44 whether or not such continuity is intact. Thus, the absence of the pilot tone indicates a discontinuity or failure in the signal path and requires the microcomputer 44 to respond with a reconfiguration of the faulty RF communication path using the cable switching unit 42.

Using one of the previously described types of system management communication, for example, the separate conductors 34 and associated buffers 56, the decisions behind this reconfiguration control can be performed at the control station 18. Alternatively, such decision making can be automatically executed by the microcomputer 44 along with conventional address decoding circuitry 58 and program memory 60. In any case, once an appropriate configuration is established, the microcomputer 44 sends configuration data on lines 64 to a latch 66, which stores the configuration data for use by the cable switching unit 42. In the event of a power failure or other malfunction, the configuration data is stored in non-volatile memory 68 and retrieved for re-programming the cable switching unit 42 when the malfunction is corrected.

The microcomputer 44 may be implemented using an MC68HC11-type integrated circuit, available from Motorola, Inc., Schaumburg, Ill.

Figure 4:
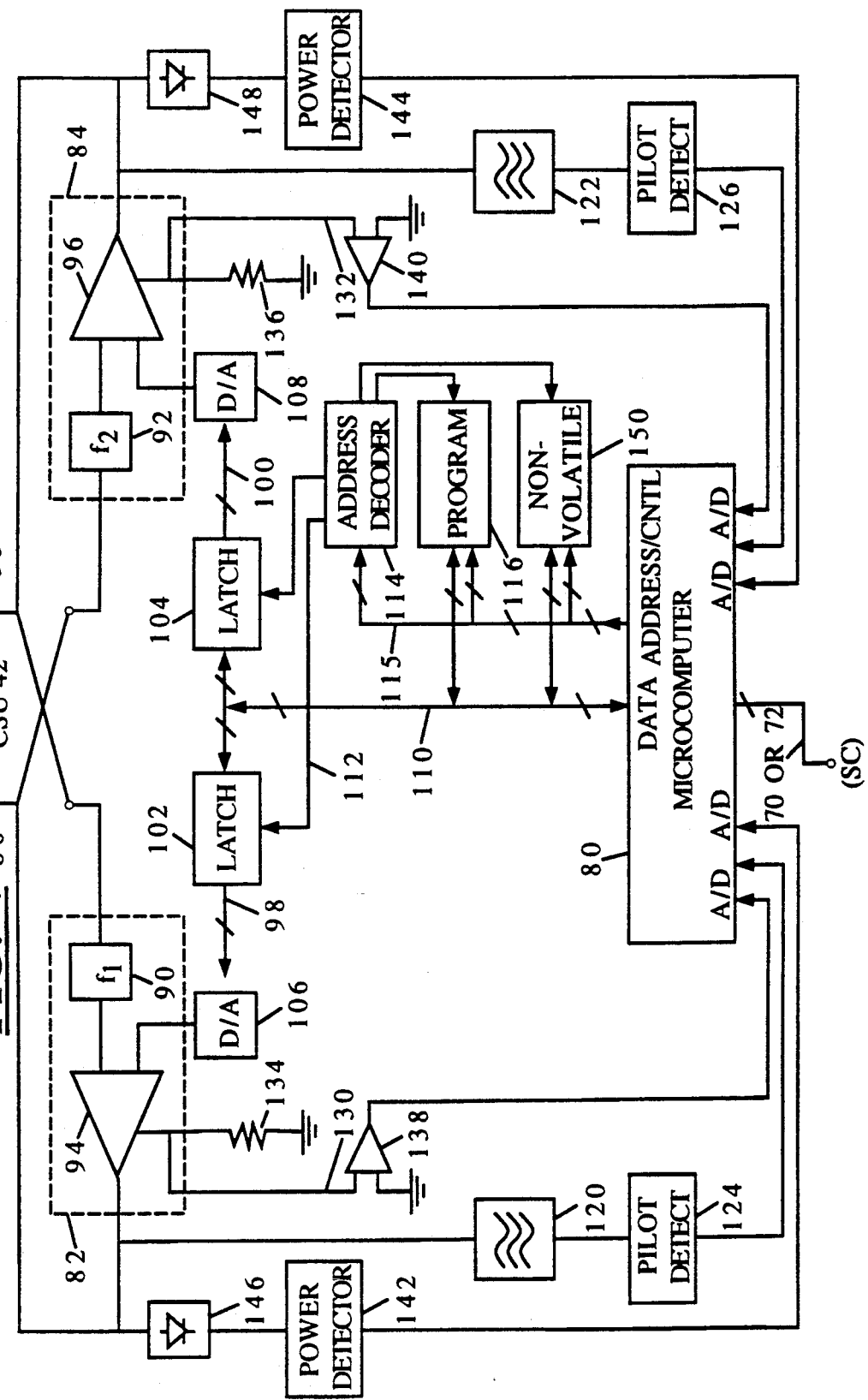
FIG. 4 is a block diagram of the amplifier 38 or 40 of FIG. 2.

Communication between the microcomputer 44 and the amplifiers 38 and 40 is provided by a pair of serial communications links (SC) 70 and 72. As illustrated in FIG. 4, at each amplifier 38 or 40, a microcomputer 80, which also may be implemented using an MC68HC11-type integrated circuit, controls the operation of the amplifier based upon the information communicated over the serial communications link.

The primary function of each amplifier 38 or 40 is to amplify the incoming and out-going signals received over the radiating coaxial cables 32, via the cable switching unit (CSU) 42. Each amplifier 38 or 40 is bidirectional in that each includes a pair of amplifier circuits 82 and 84 having their respective outputs connected to the other's respective inputs at RF ports 86 and 88. The amplifier circuits 82 and 84 differ only in that one amplifies the incoming signal, while the other amplifies the out-going signal. Bandpass filters 90 and 92 are situated at the input of the respective amplifier circuits 82 and 84 to differentiate the signals before they reach power amplification stages 94 and 96.

The gain for the power amplification stages 94 and 96 is controlled by pair of gain input signals 98 and 100 which are generated by the microcomputer 80. The signals 98 and 100 are passed over the microcomputer data bus 100 and latched into latches 102 and 104 using a latch control signal 112, which is provided by an address bus decoder 114; the address bus decoder responds to the microcomputer's address and control lines, depicted as bus 115. Conventional digital-to-analog (D/A) converters 106 and 108 convert the digital signals at the latches 102 and 104 to set the gain at the amplification stages 94 and 96. The magnitude of the signals 98 and 100 may be determined directly at the amplifier 38 or 40 using program memory 110 or indirectly at the control station 18 using the system management communication. Preferably, these magnitudes are established at a normal level which is preprogrammed into a program memory 116 and altered only in response to a command received by the microcomputer 80 from the control station 18.

The microcomputer 80 monitors the outputs of the amplifier circuits 82 and 84 to verify that the pilot signal generated throughout the system has passed through the amplification stages, and to determine the magnitudes of the current drawn and of the power generated by the amplification stages 94 and 96. Status information received by the microcomputer 80 that is associated with these parameters is passed along to the control station 18, for evaluation of faults. This evaluation may be accomplished by comparing the received status information with information that has been programmed into the control station memory.

The microcomputer 80 checks the integrity of the amplifier 38 or 40 using bandpass filters 120 and 122, which pass only the system's pilot signal, and pilot tone detectors 124 and 126, which provide a binary indication of that integrity to the microcomputer 80. This pilot tone circuitry, along with similar circuitry in the ISU, allows the user at the control station 18 to isolate loss of pilot tone to a problem at either a particular amplification device 20 or at a particular amplification stage 94 or 96.

The microcomputer 80 determines the magnitudes of current drawn by the amplification stages 94 and 96 by monitoring a pair of voltage signals associated therewith at leads 130 and 132. These voltage signals are developed using resistors 134 and 136, which receive amplifier current signals that are proportional to the current actually drawn by the amplification stages 94 and 96. Analog buffers 138 and 140 are used to provide the corresponding analog signals for A/D converters, which are internal to the microcomputer 80.

The microcomputer 80 determines the magnitudes of the power generated by the amplification stages 94 and 96 by monitoring a pair of power detect circuits, which are coupled to the outputs of the amplification stages 94 and 96 through signal rectification circuits 146 and 148.

Monitoring the current drawn and the power generated by the amplification stages 94 and 96 allows the user at the control station 18 to monitor the status of each amplifier 38 and 40 for system maintenance and configuration control. For example, if the current monitoring process indicates that excessive current is being drawn by the amplification stages 94 and 96 at regular intervals, from the control station 18, the user may replace the amplifier 38 with the amplifier 40 using the system management communication. Similarly, adjustments to the power at the outputs of the amplification stages 94 and 96 can be controlled at the control station 18 by sending a command to adjust the gain of the amplification stages 94 and 96. All gain adjustment commands are preferably stored in non-volatile memory 150 for local reprogramming by the microcomputer 80 after a power failure.

Those skilled in the art will appreciate that while the amplifier circuits 82 and 84 are depicted as a single stage, any number of amplification stages may be used to provide the necessary amplification for the system. For example, the multiple amplification stages used in conventional cellular radio units (fixed units, portables and mobiles) may be used to implement the amplification circuits 82 and 84. For each stage of amplification, gain control and power and current monitoring by the microcomputer 80 is preferably performed as described above. Moreover, the control functions provided using the control station can be locally provided using a keyboard and display directly coupled with the microcomputer 44 or 80.

Figure 5:
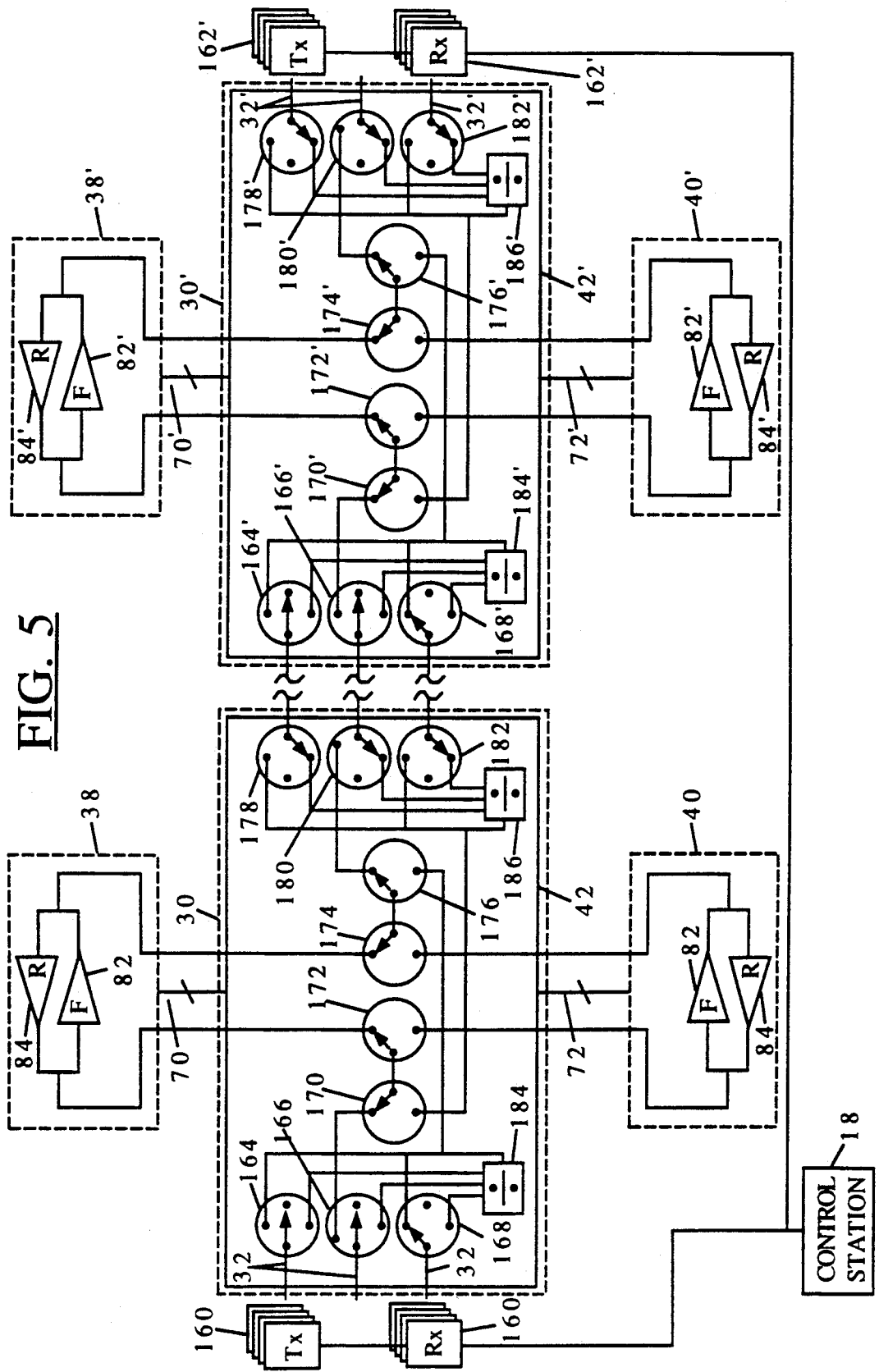
FIG. 5 is a block diagram of a system which is similar to the system of FIG. 1 with detail directed to a cable switching unit 42 configured for normal operation, according to the present invention, which is part of the interface and switching unit 30 of FIG. 3.

FIG. 5 provides a detailed view of two CSUs 42 and 42', shown within respective ISUs 30 and 30' in the context of a system diagram. The system illustrated in FIG. 5 is the same as the system of FIG. 1 except for two differences. The first difference is the presence of transmitter (Tx) and receiver (Rx) base station equipment 160 and 162 at both ends of the radiating coaxial cable 32 in FIG. 5, wherein FIG. 1 represents such equipment only at one end (at port 14) of the radiating coaxial cable 32. The second difference is that, unlike the system illustrated in FIG. 1, the system in FIG. 5 includes an optional communication path along a third line of radiating coaxial cable 32 for application in a third respective tunnel.

Each of the CSUs 42 and 42' includes conventional two-pole and three-pole reed switches 164–182 and 164'–182' and conventional power divider/summers 184–186 and 184'–186'. The reed switches are controlled using peripheral ports of the microcomputer 44 of the ISU 30. The reed switches are changed from their normal positions, as shown in FIG. 5, in response to commands from the control station 18, to overcome faults and to reconfigure the system as may be required The divider/summers 184–186 and 184'–186' are used with the reed switches to provide additional configuration flexibility for the system.

In normal operation, the system of FIG. 5 carries RF and system management information from the base station equipment 160 and from the control station 18 along the radiating coaxial cable 32 from left to right, and returns information (from radio units) to the base station equipment 160 and to the control station 18 along the radiating coaxial cable 32 from right to left. The base station equipment 160 is considered the primary equipment which is used in normal operation. The base station equipment 162 is considered standby equipment, which is used in the event of certain system faults.

In this normal two-way radio communication configuration, the RF and system management information traveling from the left ("forward signals") is carried on all radiating coaxial cables 32, but carried through the CSUs 42 and 42' only from the radiating coaxial cables 32 connected to the reed switches 168 and 168', respectively.

As shown in FIG. 5, this normal configuration passes forward signals through the reed switches 168–172, the amplification circuit 82, the reed switches 174–176, the divider/summer 186, the reed switches 178–182, the radiating coaxial cables 32 between the CSUs 42 and 42', the reed switches 168'–172', the amplification circuit 82', the reed switches 174'–176', the divider/summer 186', the reed switches 178'–182' and the radiating coaxial cables 32 connected to the reed switches 178'–182'. In this configuration of FIG. 5, the RF and system management information traveling from the right ("reverse signals") is carried from any and all radiating coaxial cables 32 and combined at the divider/combiner 186 or 186' in each CSU 42 or 42', respectively.

As shown in FIG. 5, this configuration passes reverse signals through the reed switches 178'–182', the divider/combiner 186', the reed switches 176'–174', the amplification circuit 84', the reed switches 172'–170', and the reed switch 168' and its associated radiating coaxial cable 32. Additional signals picked-up by the radiating coaxial cables 32 between the CSUs 42 and 42' are passed along to the CSU 42 with the reverse signals routed through the reed switch 168'. Both sets of reverse signals are passed through the reed switches 178–182, the divider/combiner 186, the reed switches 176–174, the amplification circuit 84, the reed switches 172–170 and the reed switch 168 and its associated radiating coaxial cable 32 before reaching the base station equipment 160.

The system illustrated in FIG. 5 may be easily reconfigured in the event of a fault by using the reed switches in the CSUs to change the communication paths which carry the information to and/or from the base station equipment 160 and the control station 18. The structure of the CSUs 42 provides for an endless number of reconfigurations. For example, if the microcomputer 80 detects that an excessive amount of current is being drawn from the amplification circuit 82 in the amplifier 38, the microcomputer reports the problem to the control station 18. The control station 18 then issues a command to the microcomputer 44 in the ISU 30, using system management communication, instructing that the microcomputer 44 replace the primary amplifier 38 with the secondary amplifier 40. This is accomplished, using the peripheral outputs of the microcomputer 44, by reversing the connections of the poles on the reed switches 172 and 174 to allow both forward and reverse information to be amplified by the secondary amplifier 40.

Figure 6:
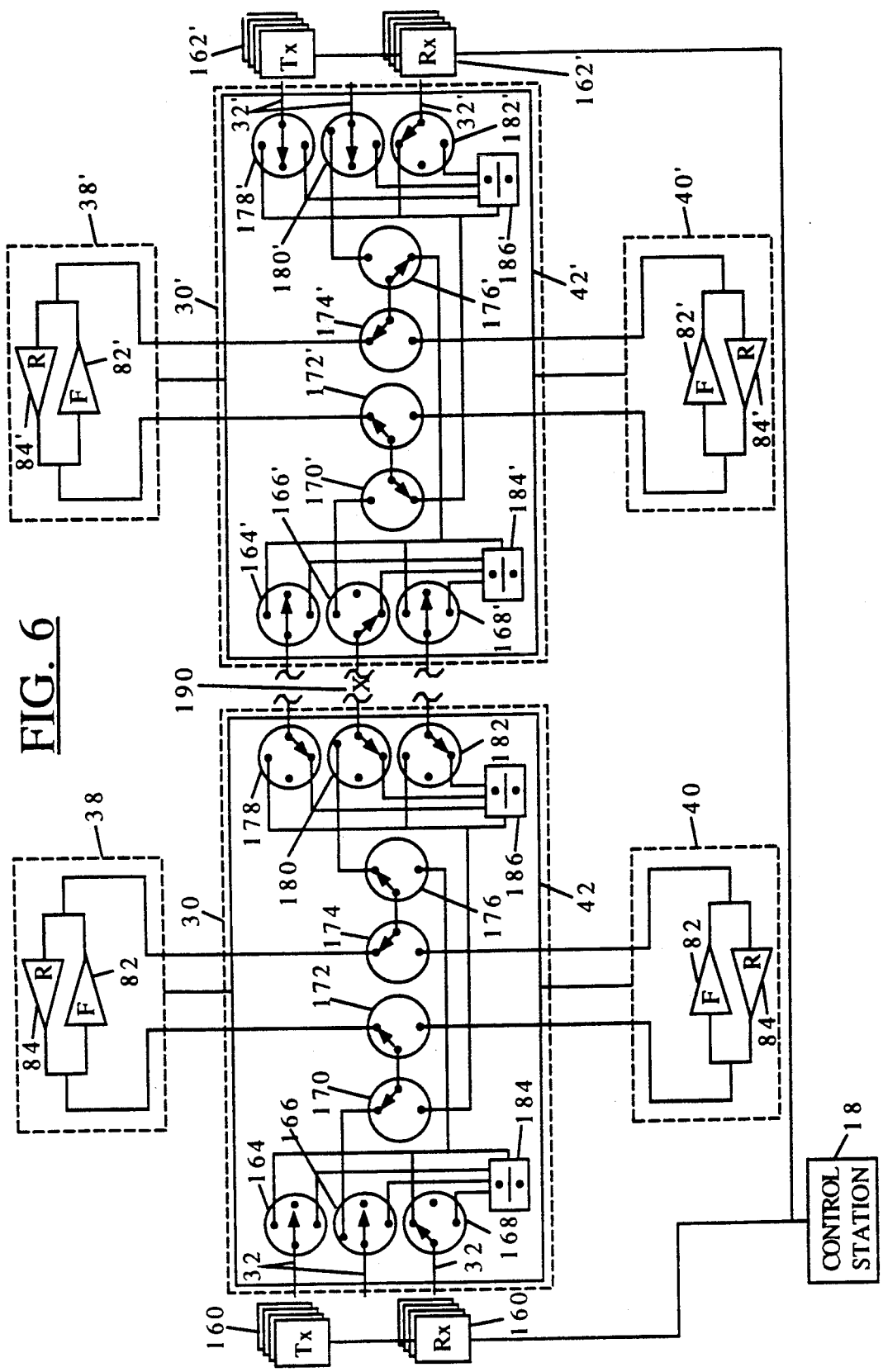
FIG. 6 is the same diagram as the diagram shown in FIG. 5, except that the cable switching unit 42 of FIG. 6 is configured to provide system communication in the presence of a system fault.

FIG. 6, which illustrates the same system as shown in FIG. 5, is provided to demonstrate how a break in one of the radiating coaxial cables 32 may be overcome through a system reconfiguration More specifically, FIG. 6 illustrates one way in which the system may be reconfigured if a cable brake is detected at point 190 by the microcomputer 44' of the ISU 30'; for example, in the event the pilot detect circuit 50' indicates that the pilot tone in the forward direction is absent. In response to this condition, the system reconfigures itself by changing the pole connections of the reed switches 166', 168', 170', 176', 178', 180' and 182', as shown in FIG. 6, and by activating the standby base station equipment 162. This allows forward signals to travel from both sets of base station equipment 160 and 162 along the center cable 32 up to either side of the broken point 190 of the cable, and allows reverse signals to travel to both sets of base station equipment 160 and 162 along the center cable 32 from either side of the broken point 190 of the cable. By switching the connections of the poles of the reed switches 170' and 176' to the lower positions, the amplifier 38' is effectively reversed to accommodate the forward and reverse signals from the base station equipment 162. No other changes to the system from the configuration of FIG. 5 are necessary.

In a similar manner, a second fault in the cables 32 may be accommodated. For example, in addition to the fault at point 190 of the cable 32, if a brake were to occur in the cable 32 which connects reed switches 182 and 168', the system can be reconfigured as shown in FIG. 6 with only one difference. The difference relates to reed switch 168' and requires its pole to be in the down position so that it connects to the divider/summer 184'. Thus, within the CSU 42', forward signals pass from the switch 182', through the reed switches 170'-172', through the amplifier circuit 82', through the reed switches 174'-176', through the divider/summer 184' and out through the reed switches 166' and 168'.

Figure 7:
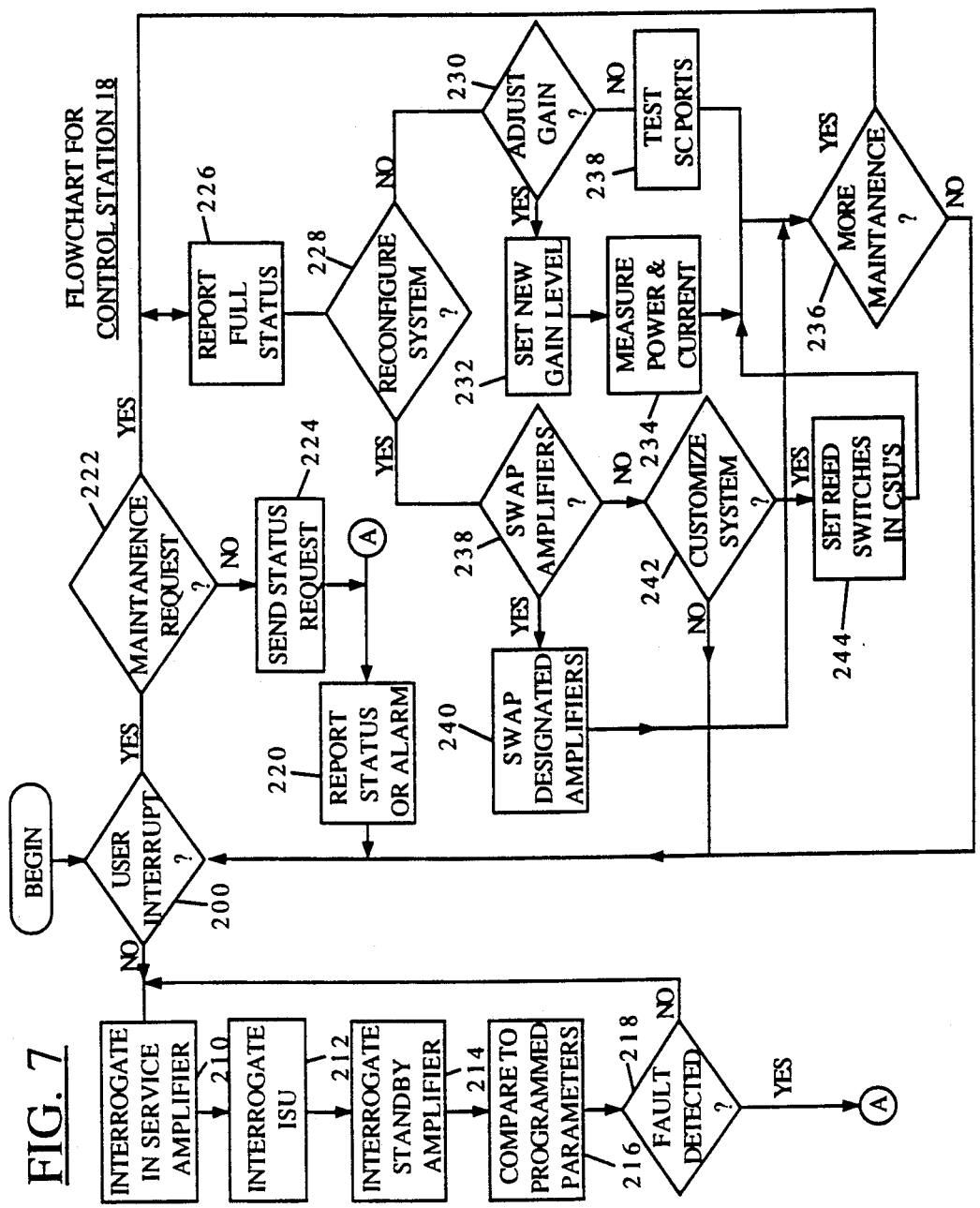
FIG. 7 is a flow chart illustrating a way in which the control station 18 of FIG. 1 may be programmed to provide system management communication.

FIG. 7 illustrates a flow chart which may be used to program the control station 18 of FIG. 1 to establish the previously discussed system management communication between the control station and the amplification devices 20. The flow chart begins at block 200 where a test is performed by the control station to determine if the user of the control station has made a request to interface with one of the amplification devices; hereinafter, this request is referred to as a "user interface request." If such a request has not been made, flow proceeds from block 200 to block 210 where the control station interrogates the status of each of the system's in-service amplifiers. This is accomplished by the control station sending a status request command to each ISU, instructing each ISU to report the status of the in-service amplifiers connected thereto.

From block 210, flow proceeds to block 212 where the status of each ISU is interrogated. An ISU interrogation preferably includes each ISU verifying that its serial communication ports are operating properly, and that the pilot tone is being detected.

From block 212, flow proceeds to block 214 where the status of the stand-by amplifier is interrogated. This interrogation is identical to the interrogation depicted by block 210 for the in-service amplifier.

From block 214, flow proceeds to block 216 where the control station compares the information reported by the ISU's to preprogrammed parameters stored in the control station memory. Using this comparison to determine the acceptability of the information, at block 218, the control station determines whether or not a fault is present in one of the ISU's. If no fault is detected at any of the ISU's, flow returns to block 210. If a fault is detected, flow proceeds to block 220 where the control station reports the fault as an alarm.

From block 200, if a user interface request at the control station is made, flow proceeds to block 222 where a test if performed to determine if the user interface request is of the maintenance type, which requires a system change rather than a status report. If the user interface request is not of the maintenance type, no adjustments or reconfigurations to the system are needed, and flow proceeds to block 224 with a command from the user for a report on the status of a particular device. From block 224, flow proceeds to block 220 where a report on that device is provided for display at the control station. From block 220, flow returns to block 200.

From block 222, if the user interface request is of the maintenance type, an adjustment or reconfiguration of the system is sought, and flow proceeds to block 226 for a complete system status report for the user. From block 226, flow proceeds to block 228 where a test is performed to determine if the user interface request involves a system reconfiguration, which involves changing the settings of the reed switches in the CSU.

If a system reconfiguration is requested, flow proceeds to block 238 where a test is performed to determine if the user interface request involves swapping amplifiers at a particular amplification device. If the user interface request is an instruction to swap amplifiers at a designated amplification device, flow proceeds to block 240 where the amplifiers are swapped. From block 240, flow proceeds to block 236.

From block 238, if the user interface requests does not involve swapping amplifiers, flow proceeds to block 242 where a test is performed to determine if the user interface request involves customizing the system by changing the poles of the reed switches in the CSUs. If such customization is not requested, flow returns from block 242 to block 200, thereby allowing the user to exit this portion of the program without any reconfiguration. If the user interface request involves customizing the system, flow proceeds to block 244 where the designated reed switches are changed. From block 244, flow proceeds to block 236.

If the user interface request does not involve a system reconfiguration, flow proceeds from block 228 to block 230 where a test is performed to determine if the user interface request is a request to adjust the gain of a particular amplifier stage. If the request is not to adjust the gain of an amplifier stage, flow proceeds to block 238 where a serial communication port test is performed between the ISU and the microcomputers in the amplifiers.

If the user interface request involves an adjustment to the gain, flow proceeds from block 230 to block 232 where the user inputs new gain level for a designated amplifier stage, the ISU passes that instruction to the microcomputer in the designated amplifier and the new gain is set. From block 232, flow proceeds to block 234 where the output of the amplifier circuit is measured by the microcomputer of the amplifier. From blocks 234 and 238, flow proceeds to block 236 where a test is performed to determine if additional maintenance to the system is required. If not, flow returns from 236 to block 200. If more maintenance is required or requested from the control station, flow returns from block 236 to block 226.

Figure 8:
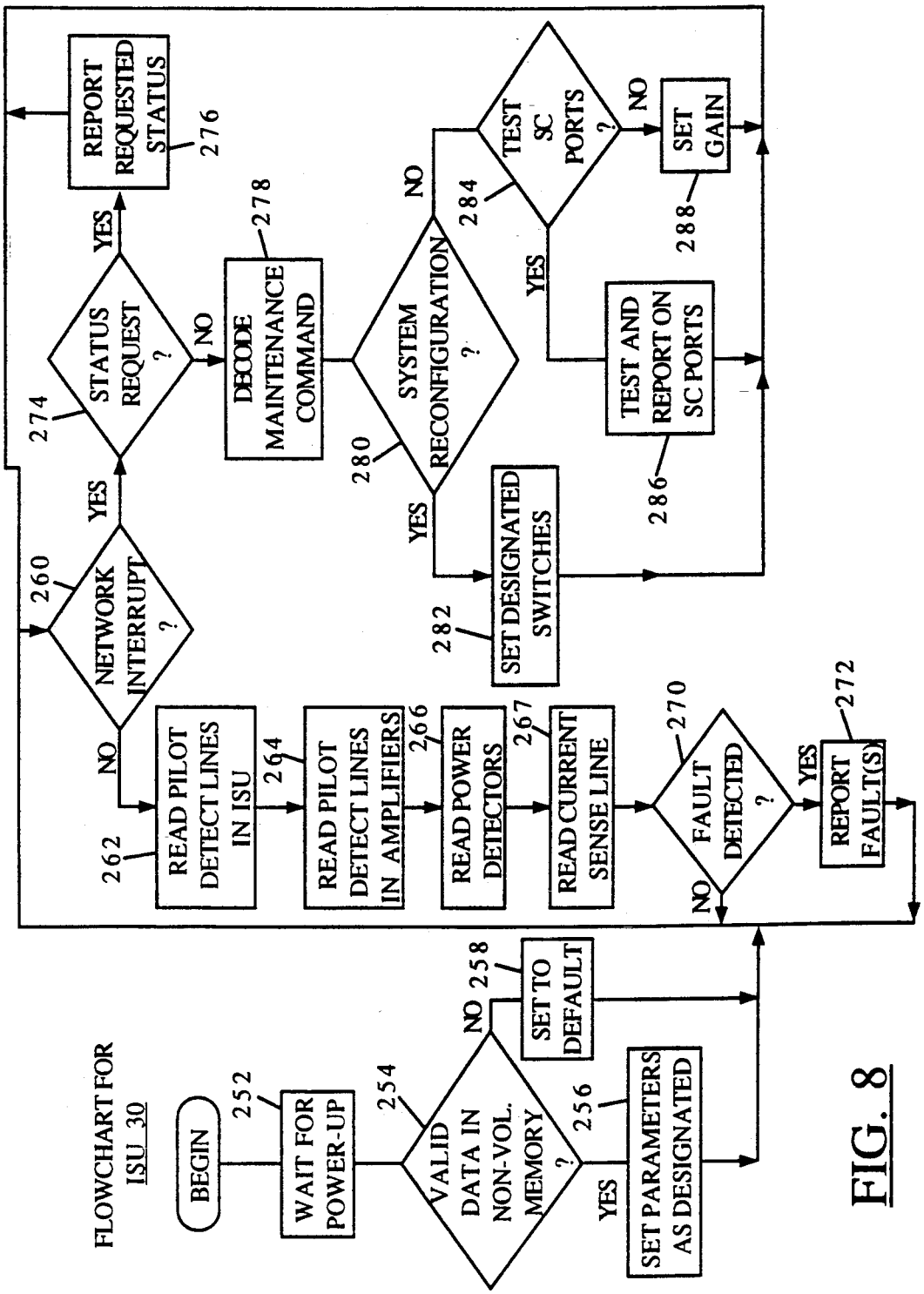
FIG. 8 is a flow chart illustrating a way in which a microcomputer used in the interface and switching unit 30 may be programmed to operate.

FIG. 8 illustrates a flow chart which may be used to program the microcomputer 44 of the ISU. The flow chart begins at block 252 where the microcomputer waits until it is completely powered up. From block 252, flow proceeds to block 254 where a test is performed to determine if the nonvolatile memory has been programmed with customized positions for the reed switches in the CSU. This may be accomplished by programming a portion of the non-volatile memory with a special code when it is programmed with customized positions. Presence of the special code indicates that customized positions have been programmed.

If the non-volatile memory in the ISU has been programmed for such customization, flow proceeds from block 254 to block 256 where the reed switches are positioned as designated by the data in the nonvolatile memory. If the nonvolatile memory does not contain data for such customization, flow proceeds from block 254 to block 258 where the reed switches are set to a default mode, for example, as illustrated in FIG. 5, as designated by the program memory of the ISU. From both blocks 256 and 258, flow proceeds to block 260 of FIG. 8.

At block 260 of FIG. 8, a test is performed to determine if the control station has attempted communication with the CSU. If no communication from the control station has been requested, flow proceeds from block 260 to block 262 where the ISU begins its normal mode of monitoring the ISU and its associated amplifiers.

At block 262, the ISU determines if pilot tone is reaching the ISU properly. From block 262 flow proceeds to block 254 where the ISU communicates with the microcomputers in the associated amplifiers to determine if pilot tone is passing through the amplifiers. At block 266 and block 267, the ISU communicates with the amplifiers to determine the status of both the power detectors and the current sense lines associated with each amplifier circuit. As discussed in connection with FIG. 3, all such communication between the microcomputer 44 of the ISU and the microcomputer 80 of the amplifiers 3 and 40 is performed using the serial communication buses (CS).

Other status checks with the amplifiers may be performed as well. For example, if the amplifier circuits are configured using a phase-locked-loop circuit, the microcomputer and the associated amplifier can be instructed to test the lock time of the phase-locked-loop and to report that lock time to the ISU.

The status checks discussed in connection with blocks 262 and 267 are evaluated by the microcomputer in the ISU to determine if a fault is present, depicted at block 270. If a fault is detected, that fault is reported to the control station for display to the user and flow returns to block 260. If no faults ar detected between blocks 262 and 267, flow returns from block 270 to block 260.

From block 260, if there has been an attempted communication with the ISU, flow proceeds to block 274 where a test is performed to determine if that communication involves a status request to the ISU. If so, the ISU determines the requested status and reports that status back to the control station, depicted at block 276. From block 276, flow returns to block 260.

If the communication from the control station does not involve a status request, the communication is interpreted as a maintenance command which is decoded at block 278. At block 280, the ISU determines if the maintenance command involves a system reconfiguration. If a system reconfiguration has been requested, flow proceeds to block 282 where the designated reed switches are set as requested to accomplish the reconfiguration. From block 282, flow returns to block 260.

At block 280, if a system reconfiguration is not involved, flow defaults to block 284 where a test is performed to determine if the maintenance command involves merely testing the serial communication ports between the ISU and the amplifiers. If so, flow proceeds to block 286 where the serial communication ports are tested and reported on for the control station. If the user interface request does not involve testing the serial communication ports, the communication from the control station is a gain adjustment request, and flow proceeds from block 284 to block 288 where the program sets the gain of the designated amplifier stage. From blocks 286 and 288, flow returns to block 260.

Figure 9:
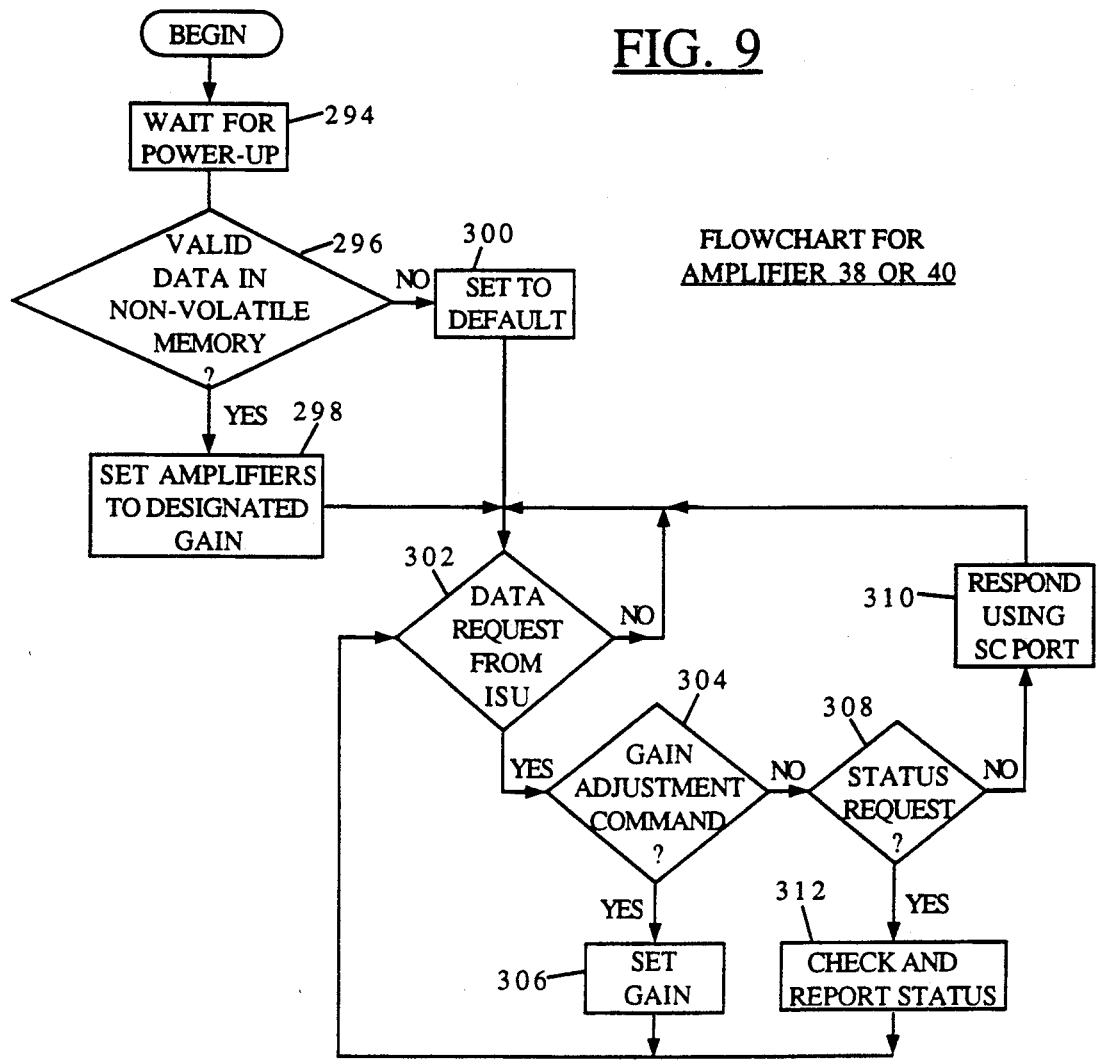
FIG. 9 is a flow chart illustrating a way in which a microcomputer used in the amplifier 38 or 40 may be programmed to operate.

FIG. 9 illustrates a flow chart which may be used to program the microcomputer 80 in the amplifier 38 or 40. The flow chart begins at block 294 where the microcomputer waits until it is completely powered up. From block 294, flow proceeds to block 296 where a test is performed to determine if there is valid data in the nonvolatile memory for storing a designated gain at the input of the amplifier circuits. If the nonvolatile memory contains valid data for this purpose, flow proceeds from block 296 to block 298 where the microcomputer sets the gain in the amplifier circuits. If the data in the nonvolatile memory has not been programmed with such data, flow proceeds to block 300 where the gain of the amplifier circuits is set to a default level which has been previously programmed into the program memory for the microcomputer 80. From blocks 298 and 300, flow proceeds to block 302.

At block 302, a test is performed to determine if there has been a communication request from the ISU to the microcomputer 80 in the amplifier. If not, flow returns to block 302, and the microcomputer 80 continues to wait for such a request.

Once a communication request from the ISU occurs, flow proceeds from block 302 to block 304 where the microcomputer begins to interpret the communication request from the ISU. At block 304, a test is performed to determine if the communication from the ISU is a request to adjust the gain of the amplifier circuits. If the communication concerns such a gain adjustment, flow proceeds from block 304 to block 306 where the new gain level is set at the designated amplifier circuits. Flow returns from block 306 to block 302.

If the communication from the ISU does not concern a gain adjustment, flow proceeds from block 304 to block 308 where a test is performed to determine if the communication request from the ISU is a status request. If the communication does not involve a status request, the microcomputer presumes that the communication is a test of the serial communication port between the ISU and the amplification device and, therefore, responds with a predetermined reply, depicted at block 310.

If the communication request from the ISU involves a status request, flow defaults from block 308 to block 312 where the microcomputer determines the status of the amplification device, as instructed in the communication from the ISU, and reports such status to the ISU. From block 312, flow returns to block 302.

While the invention has been particularly shown and described with reference to various embodiments, it will be recognized by those skilled in the art that other modifications and changes may be made to the present invention described above without departing from the spirit and scope thereof.

What is claimed is:

1. A management arrangement for a communication system serving a plurality of radio units, comprising:
   (a) a communication network, including:
      (i) a plurality of conductors, including a plurality of radiating transmission lines, said plurality of conductors being arranged to form a linked network of conductor sections having a first communication path therethrough, and a plurality of amplification devices arranged at periodic intervals along said linked network of conductor sections to amplify signals carried by the conductors and to allow radio communication among said plurality of radio units within a prescribed coverage area using radio frequency radiation released by the plurality of radiating transmission lines; and
      (ii) means for switching said linked network of conductor sections to create a second communication path therethrough, said means for switching located along said link network so as being arranged at at least one of said amplification devices at said periodic intervals to interconnect at least one of two of said radiating transmission lines; and (b) a control station for selectively controlling said means for switching, said control station responding to a fault in the network of conductors by commanding the means for switching to create said second communication path through the network to overcome the fault.

2. A management arrangement, according to claim 1, wherein the plurality of radiating transmission lines includes radiating coaxial cables, and wherein said means for switching is arranged directly between said two radiating transmission lines.

3. A management arrangement, according to claim 1, wherein the radiating transmission lines are arranged in tandem segments, each segment being intercoupled with another tandem segment by one of the amplification devices to provide distinct paths of communication through the radiating transmission lines between the radio units and the communication system.

4. A management arrangement, according to claim 3, wherein selected ones of the plurality of amplification devices include means, responsive to control data, for changing at least one path of communication through the communication system.

5. A management arrangement, according to claim 1, wherein at least one of said plurality of amplification devices includes means, responsive to control data, for adjusting a gain factor of said at least one of said amplification devices.

6. A management arrangement, according to claim 1, wherein the radiating transmission lines include means for carrying a transmit frequency and a receive frequency and the amplification devices include means for amplifying both the transmit frequency and the receive frequency.

7. A management arrangement, according to claim 1, wherein at least one of the plurality of amplification devices includes means for generating operational status data, indicative of an operational characteristic of the amplification device, and for passing the status data to the control station.

8. A management arrangement, according to claim 7, wherein the control station includes display means, responsive to the received status data, for displaying the status data.

9. A management arrangement, according to claim 1, wherein selected ones of the amplification devices includes means, coupled to the radiating transmission lines, for evaluating the integrity of the radiating transmission lines.

10. A management arrangement, according to claim 1, including a dedicated set of conductors which carry control data from the control station to the amplification devices.

11. A management arrangement, according to claim 10, wherein the control data is passed to the amplification devices using the radiating transmission lines to carry the control data.

12. A method for managing a communication system serving a plurality of radio units, comprising the steps of:

arranging a plurality of conductors, including a plurality of radiating cables, to form at least one linked network of conductors, said conductors carrying signals to an from the radio units, and a plurality of amplification devices which are arranged at periodic intervals along said at least one linked network to amplify signals carried by the conductors and to provide a path of communication through the conductors such that radio communication is provided to a prescribed coverage area using radio frequency radiation released by the plurality of radiating cables;

providing a plurality of cable switching means respectively coupled to the amplification devices and between said conductors;

providing a control station, coupled to the amplification devices, for sending control data to the amplification devices and for receiving status data from the amplification devices, said status data being indicative of an operating condition of at least one of the amplification devices;

detecting a fault in the system by evaluating the status data sent to the control station from said at least one of the amplification devices; and sending a command from the control station to a selected one of the amplification devices, as part of the control data, which instructs the selected one of the amplification devices to change the path of communication through at least one of the plurality of cable switching means to overcome the fault;

whereby the operation of said control station and said amplification devices is transparent to said plurality of radio units.

13. A method, according to claim 12, further including the step of programming a microcomputer within at least one of the amplification devices to monitor the status of the amplification device.

14. A method, according to claim 13, further including the step of providing input means coupled directly to the microcomputer to provide user control to the amplification device independently of the control station.

15. A management arrangement for a communication system serving a plurality of radio units, comprising:

(a) a control station having a computer for transmitting control data; and (b) a communication network, including:

(i) a plurality of amplification devices; and (ii) a plurality of radiating cables arranged in tandem segments to form a cascaded network, each tandem segment being intercoupled with other tandem segments by one of the amplification devices to provide a first path of communication through the radiating cables between said radio units and the communication system, said control data being transmitted to selected ones of the amplification devices to alter an operational characteristic of said selected ones of the amplification devices, said selected ones of the amplification devices including means, responsive to the control data and arranged between said tandem segments, for creating a second path of communication through the radiating cables, said control station responding to a fault in the network of conductors by commanding the means for creating a second path of communication to switch the communication path through the network to overcome the fault.

16. A management arrangement for a two-way communication system serving a plurality of radio units through an elongated coverage area, comprising:
(a) a communication network, including:
  (i) a plurality of conductors, including radiating coaxial cables, and a plurality of amplification devices for amplifying signals carried by the radiating coaxial cables coupled with the plurality of conductors, wherein the radiating coaxial cables are arranged in tandem segments to form a network, each segment being intercoupled with another tandem segment by one of the amplification devices to provide a two-way path of communication between said radio units and the communication system; and
  (ii) switching means, coupled to the amplification devices and responsive to control data, for changing the path of communication through the communication system, said switching means arranged between said tandem segments; and
(b) a control station, coupled to the amplification devices, for monitoring and controlling the amplification devices by sending said control data to and receiving status data from the amplification devices, said control station responding to a fault in the network of conductors by commanding the switching means to switch the communication path through the network and overcome the fault.

17. A circuit for use in a communication system using radiating cables as an antenna to allow communication among a plurality of radio units, comprising:
(a) a communication network having a cable switching unit and a plurality of lines of segmented radiating cables, said cable switching unit arranged to interconnect the plurality of lines of segmented radiating cables such that a communication path is provided through selected ones of the interconnected cables and the cable switching unit, said cable switching unit responding to control signals by changing at least one of the interconnected cables and thereby changing the communication path in the presence of a fault on said one of the plurality of lines to overcome the fault; and
(b) processing means, coupled to the cable switching unit, for generating said control signals;
wherein said processing means commands said cable switching unit so as to maintain radio communication integrity for said plurality of radio units.

18. A circuit, according to claim 17, further including sensing means, coupled to the processing means, for determining if at least one of the radiating cables includes said fault.

19. A circuit, according to claim 17, further including a signal processing amplification circuit, coupled to the cable switching unit, for amplifying signals carried by the radiating cables and for monitoring parameters which control signal amplification.

20. A management arrangement for a communication system serving a plurality of radio units, comprising:
(a) a communication network, including:
  (i) a plurality of conductors, including a plurality of radiating transmission lines, said plurality of conductors being arranged to form a linked network of conductor sections having a first communication path therethrough, and a plurality of amplification devices arranged at periodic intervals along said linked network of conductor sections to amplify signals carried by the conductors and to allow radio communication among said plurality of radio units within a prescribed coverage area using radio frequency radiation released by the plurality of radiating transmission lines; and
  (ii) means for switching said linked network of conductor sections to create a second communication path therethrough, said means for switching being arranged between said conductor sections; and
(b) a control station for selectively controlling said means for switching, said control station responding to a fault in the network of conductors by commanding the means for switching to create said second communication path through the network to overcome the fault, wherein at least one of the plurality of amplification devices includes means for generating operational status data, indicative of an operational characteristic of the amplification device, and for passing the status data onto an associated one of the radiating transmission lines for reception by the control station.

21. A circuit for use in a communication system using radiating cables as an antenna to allow communication among a plurality of radio units, comprising:
(a) a communication network having a cable switching unit arranged to interconnect two lines of radiating cables such that a communication path is provided through one of the two lines and the cable switching unit, said cable switching unit responding to control signals by changing the communication path to include the other of said two lines in the presence of a fault indicated on said one of the two lines to overcome the fault;
(b) processing means, coupled to the cable switching unit, for generating said control signals; and
(c) a signal processing amplification circuit, coupled to the cable switching unit, for amplifying signals carried by the radiating cables and for monitoring parameters which control signal amplification.

22. A management arrangement for a communication system serving a plurality of radio units, comprising:
(a) a communication network, including:
  (i) a plurality of conductors, including a plurality of radiating transmission lines, said plurality of conductors being arranged to form a linked network of conductor sections having a first communication path therethrough, and a plurality of amplification devices arranged at periodic intervals along said linked network of conductor sections to amplify signals carried by the conductors and to allow radio communication among said plurality of radio units within a prescribed coverage area using radio frequency radiation released by the plurality of radiating transmission lines; and
  (ii) means for switching said linked network of conductor sections to create a second communication path therethrough, said means for switching being arranged between said radiating transmission lines; and
(b) a control station for selectively controlling said means for switching, said control station responding to a fault in the network of conductors by commanding the means for switching to create said second communication path through the network to overcome the fault, wherein selected ones of the amplification devices include means, coupled to the radiating transmission lines, for evaluating the integrity of the radiating transmission lines.

23. A management arrangement for a communication system serving a plurality of radio units, comprising:
   (a) a communication network, including:
      (i) a plurality of conductors, including a plurality of radiating transmission lines, said plurality of conductors being arranged to form a linked network of conductor sections having a first communication path therethrough, and a plurality of amplification devices arranged at periodic intervals along said linked network of conductor sections to amplify signals carried by the conductors and to allow radio communication among said plurality of radio units within a prescribed coverage area using radio frequency radiation released by the plurality of radiating transmission lines; and
      (ii) means for switching said linked network of conductor sections to create a second communication path therethrough, said means for switching being arranged between said radiating transmission lines; and
   (b) a control station for selectively controlling said means for switching, said control station responding to a fault in the network of conductors by commanding the means for switching to create said second communication path through the network to overcome the fault; and
   (c) a dedicated set of conductors which carry control data from the control station to the amplification devices.

* * * * *